(12) United States Patent
Chu et al.

(10) Patent No.: US 10,356,815 B2
(45) Date of Patent: Jul. 16, 2019

(54) CLEAR CHANNEL ASSESSMENT FOR CO-LOCATED WIRELESS NETWORKS

(71) Applicant: Marvell World Trade Ltd., St. Michael (BB)

(72) Inventors: Liwen Chu, San Ramon, CA (US); Lei Wang, San Diego, CA (US); Jinjing Jiang, San Jose, CA (US); Hongyuan Zhang, Fremont, CA (US); Yakun Sun, San Jose, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 83 days.

(21) Appl. No.: 15/487,812

(22) Filed: Apr. 14, 2017

(65) Prior Publication Data
US 2017/0303311 A1    Oct. 19, 2017

Related U.S. Application Data

(60) Provisional application No. 62/323,217, filed on Apr. 15, 2016.

(51) Int. Cl.
*H04W 74/02* (2009.01)
*H04L 29/06* (2006.01)
(Continued)

(52) U.S. Cl.
CPC ........... *H04W 74/02* (2013.01); *H04L 69/22* (2013.01); *H04W 48/10* (2013.01);
(Continued)

(58) Field of Classification Search
USPC ....................................................... 370/329
See application file for complete search history.

(56) References Cited

U.S. PATENT DOCUMENTS 9,178,593 B1   11/2015 Liu et al.
2009/0116462 A1*  5/2009 Powell .................. H04B 1/707
                                                           370/338
(Continued)

FOREIGN PATENT DOCUMENTS

WO    WO-2015/147874    10/2015

OTHER PUBLICATIONS

Luo et. al. "Discussion on Spatial Reuse Operations in 11ax" Mar. 11, 2016, pp. 12-16.*
(Continued)

*Primary Examiner* — Maharishi V Khirodhar
*Assistant Examiner* — Kenneth P Hunt

(57) ABSTRACT

A first communication device associated with a first communication network determines that a second communication device associated with a second communication network is located proximate to the first communication device. The first communication device generates a data unit that includes information indicating i) a color identifier of the second communication network, the color identifier usable to identify transmissions from the second communication network, and ii) that a dynamic clear channel assessment (CCA) procedure should not be used for transmissions from the second communication network. The first communication device transmits the data unit to at least one other communication device associated with the first communication network such that the at least one other communication device associated with the first communication network does not use the dynamic CCA procedure for transmissions identified as being from the second communication network.

30 Claims, 6 Drawing Sheets

(51) Int. Cl.
*H04W 48/10* (2009.01)
*H04W 74/08* (2009.01)
*H04W 84/12* (2009.01)
*H04W 74/00* (2009.01)

(52) U.S. Cl.
CPC ..... *H04W 74/006* (2013.01); *H04W 74/0808* (2013.01); *H04W 84/12* (2013.01)

(56) References Cited

U.S. PATENT DOCUMENTS

| | | | |
|---|---|---|---|
| 2014/0286203 A1 | 9/2014 | Jindal et al. | |
| 2014/0328270 A1 | 11/2014 | Zhu et al. | |
| 2016/0081056 A1* | 3/2016 | Barriac | H04L 43/0882 370/252 |
| 2016/0249397 A1* | 8/2016 | Seok | H04W 76/14 |
| 2017/0078887 A1* | 3/2017 | Barriac | H04B 17/318 |
| 2018/0020478 A1* | 1/2018 | Derham | H04W 74/0808 |
| 2018/0146469 A1* | 5/2018 | Luo | H04L 69/22 |
| 2018/0227952 A1* | 8/2018 | Kim | H04W 74/0808 |

OTHER PUBLICATIONS

Gong et. al. "Advanced Wireless LAN Technologies: IEEE 802.11ac and Beyond," 2008, p. 5, https://dl.acm.org/citation.cfm?id=2721933.*

Wikipedia, "Baseband," Apr. 23, 2018, pp. 1-2,https://en.wikipedia.org/wiki/Baseband.*

Lathi, "Modern Digital and Analog Communication Systems," 1998, Oxford University Press, p. 151.*

Johnson et. al. "Telecommunications Breakdown: Concep[ts of Communications Transmitted by Software Defined Radio," 2004, Pearson Prentice Hall, p. 9.*

Xia et. al. "Transmit Power Control and Clear Channel Assessment in LAA Networks," 2015, p. 210, https://ieeexplore.ieee.org/document/7194070/.*

Wisniewski, "What Networking Challenges Do You Forsee With the Onset of IoT?" Nov. 16, 2015, p. 2, https://www.ecnmag.com/article/2015/11/what-wireless-networking-challenges-do-you-forsee-onset-iot.*

O. Oteri, F. La Sita, R. Yang, M. Ghosh and R. Olesen, "Improved Spatial Reuse for Dense 802.11 WLANs," 2015 IEEE Globecom Workshops (GC Wkshps), San Diego, CA, 2015, pp. 1-6. http://ieeexplore.ieee.org/stamp/stamp.jsp?tp=&arnumber=7413992&isnumber=7413928.*

U.S. Appl. No. 14/961,558, Chu et al., "Methods and Apparatus for Carrying Out Backoff Operations," filed Dec. 7, 2015.

U.S. Appl. No. 14/963,045, Chu et al., "Methods and Devices for Determining Channel State," filed Dec. 8, 2015.

U.S. Appl. No. 15/291,818, Jiang et al., "Methods and Apparatus for Interference Aware Spatial Reuse," filed Oct. 12, 2016.

U.S. Appl. No. 15/335,160, Chu et al., "Backoff Operation in Connection with Spatial Reuse," filed Oct. 26, 2016.

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE Std 802.11™ 2012 (Revision of IEEE Std 802.11—2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

Itagaki et al., "Dynamic CCA Control and TPC Simulation Results with SS1-SS3," IEEE Draft, IEEE 802.11-15/1045r0 Submission, 54 pages (Sep. 14, 2015).

Invitation to Pay Fees and Partial International Search Report in International Application No. PCT/US2017/027617, dated Oct. 13, 2017 (21 pages).

Smith, "Dynamic Sensitivity Control V2," IEEE Draft 802.11-13/1012r4, vol. 802.11, No. 4, 30 pages (Nov. 6, 2013).

Inoue et al., "Number of BSS Color Bits," IEEE draft 802.11-15/1075r1, vol. 802.11ax, No. 1, pp. 1-20 (Sep. 14, 2015).

Luo et al., "Discussion on Spatial Reuse Operations in 11ax," IEEE draft 802.11-16/0382r0, vol. 802.11ax, 18 pages (Mar. 11, 2016).

International Search Report and Written Opinion in International Patent Application No. PCT/US2017/027617, dated Dec. 5, 2017 (23 pages).

International Preliminary Report on Patentability in International Patent Application No. PCT/US2017/027617, dated Oct. 25, 2018 (18 pages).

* cited by examiner

CLEAR CHANNEL ASSESSMENT FOR CO-LOCATED WIRELESS NETWORKS

CROSS REFERENCES TO RELATED APPLICATIONS

This application claims the benefit of U.S. Provisional Patent App. No. 62/323,217, entitled "CO-LOCATED BSS AND DYNAMIC CCA," filed on Apr. 15, 2016, the disclosure of which is hereby expressly incorporated herein by reference in its entirety.

FIELD OF TECHNOLOGY

The present disclosure relates generally to wireless communication systems, and more particularly to mitigating collisions of transmissions from co-located wireless local area networks.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method includes: determining, at a first communication device associated with a first communication network, that a second communication device associated with a second communication network is located proximate to the first communication device; generating, at the first communication device, a data unit that includes information indicating i) a color identifier of the second communication network, the color identifier usable to identify transmissions from the second communication network, and ii) that a dynamic clear channel assessment (CCA) procedure should not be used for transmissions from the second communication network; and causing the first communication device to transmit the data unit to at least one other communication device associated with the first communication network such that the at least one other communication device associated with the first communication network does not use the dynamic CCA procedure for transmissions identified as being from the second communication network.

In another embodiment, an apparatus includes a network interface device associated with a first communication device, the first communication device being associated with a first communication network. The network interface device includes one or more integrated circuits (ICs) configured to: determine that a second communication device associated with a second communication network is located proximate to the first communication device; generate a data unit that includes information indicating i) a color identifier of the second communication network, the color identifier usable to identify transmissions from the second communication network, and ii) that a dynamic clear channel assessment (CCA) procedure should not be used for transmissions from the second communication network; and cause the first communication device to transmit the data unit to at least one other communication device associated with the first communication network such that the at least one other communication device associated with the first communication network does not use the dynamic CCA procedure for transmissions identified as being from the second communication network.

In yet another embodiment, a method includes: receiving, at a first communication device associated with a first communication network, a data unit including information indicating i) a color identifier of a second communication network proximate to the first communication network, the color identifier of the second communication network usable to identify transmissions from the second communication network, and ii) that a dynamic clear channel assessment (CCA) procedure should not be used by the first communication device for transmissions from the second communication network; and responsive to identifying a transmission from the second communication network, the first communication device not using the dynamic CCA procedure for the identified transmission.

In still another embodiment, an apparatus includes a network interface device associated with a first communication device, the first communication device being associated with a first communication network. The network interface device includes one or more integrated circuits (ICs) configured to: receive a data unit including information indicating i) a color identifier of a second communication network proximate to the first communication network, the color identifier of the second communication network usable to identify transmissions from the second communication network, and ii) that a dynamic clear channel assessment (CCA) procedure should not be used by the first communication device for transmissions from the second communication network; and responsive to identifying a transmission from the second communication network, not use the dynamic CCA procedure for the identified transmission.

In still another embodiment, a method includes: determining, at a first communication device associated with a first communication network, that a second communication device associated with a second communication network is located proximate to the first communication device; generating, at the first communication device, a data unit that includes information indicating that a dynamic clear channel assessment (CCA) procedure should not be used by at least one other communication device associated with the first communication network; and causing the first communication device to transmit the data unit to the at least one other communication device associated with the first communication network such that the at least one other communication device associated with the first communication network does not use the dynamic CCA procedure.

In still another embodiment, an apparatus includes a network interface device associated with a first communication device, the first communication device being associated with a first communication network. The network interface device includes one or more integrated circuits (ICs) configured to: determine that a second communication device associated with a second communication network is located proximate to the first communication device; generate a data unit that includes information indicating that a dynamic clear channel assessment (CCA) procedure should not be used by at least one other communication device associated with the first communication network; and cause the first communication device to transmit the data unit to the at least one other communication device associated with the first communication network such that the at least one other communication device associated with the first communication network does not use the dynamic CCA procedure.

In yet another embodiment, a method includes: determining, at a first communication device associated with a first communication network, that a second communication device associated with a second communication network is located proximate to the first communication device; selecting, at the first communication device, a color identifier for the first communication network that corresponds to a color identifier for the second communication network; responsive to determining, at the first communication device, that the selected color identifier for the first communication network is different from a previous color identifier for the first communication network: generating, at the first communication device, a data unit that includes information indicating the selected color identifier of the first communication network; and causing the first communication device to transmit the data unit to at least one other communication device associated with the first communication network such that the at least one other communication device associated with the first communication network uses the selected color identifier to identify transmissions from the first communication network.

In still another embodiment, an apparatus includes a network interface device associated with a first communication device, the first communication device being associated with a first communication network. The network interface device includes one or more integrated circuits (ICs) configured to: determine that a second communication device associated with a second communication network is located proximate to the first communication device; select a color identifier for the first communication network that corresponds to a color identifier of the second communication network; responsive to determining that the selected color identifier of the first communication network is different from a previous color identifier of the first communication network: generate a data unit that includes information indicating the selected color identifier of the first communication network, and cause the first communication device to transmit the data unit to at least one other communication device associated with the first communication network such that the at least one other communication device associated with the first communication network uses the selected color identifier to identify transmissions from the first communication network.

DETAILED DESCRIPTION

To help promote spatial reuse between neighboring communication networks (e.g., WLANs), the IEEE 802.11ax Standard (sometimes referred to as IEEE 802.11 HE or IEEE 802.11 HEW) contemplates dynamically adjusting the energy level at which a channel is deemed to be idle or busy. For example, in a first wireless communication network having a first identifier (e.g., first "color," which is usable to identify transmissions from the first communication network), transmissions from a second wireless communication network having a second identifier (e.g., second "color," which is usable to identify transmissions from the second communication network) are compared to a higher threshold (e.g., energy threshold) when assessing whether the channel is busy. However, such an approach does not work well when communication devices (e.g., access points (APs)) are located in close proximity to one another. Thus, in an attempt to reduce collisions in scenarios in which two APs are located proximate to each other, various embodiments described below relate to causing communication devices in a first network, served by a first AP, to not use the dynamic CCA procedure in connection with transmissions from a second network, served by a second AP.

Figure 1A:
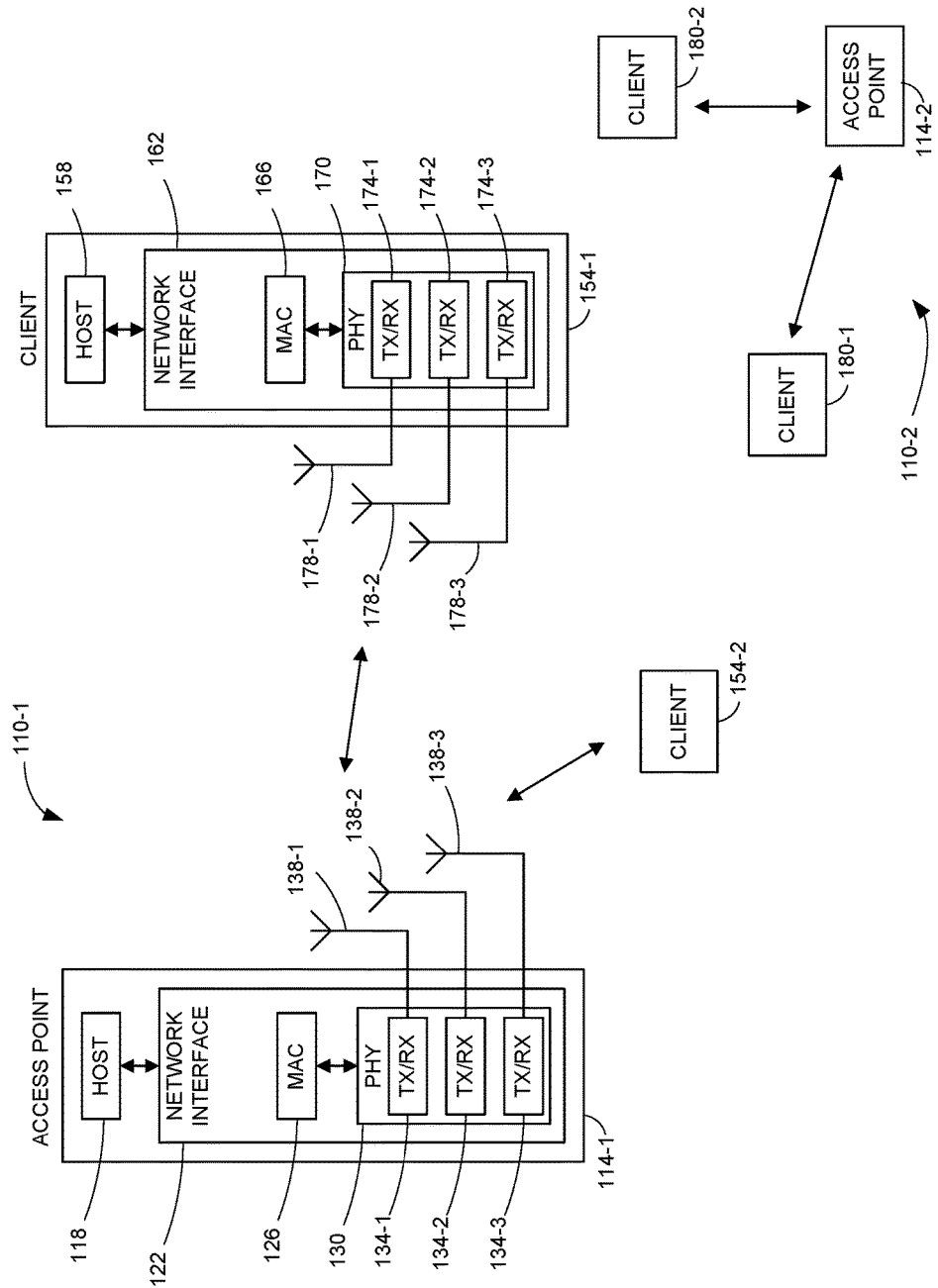
FIG. 1A is a block diagram of an example system having multiple wireless local area networks (WLANs), according to an embodiment.

FIG. 1A is a block diagram of an example communication system including multiple WLANs 110, according to an embodiment. A first WLAN 110-1 includes an access point (AP) 114-1 that comprises a host processor 118 coupled to a network interface device 122. The network interface 122 includes a medium access control layer (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1A, the AP 114-1 includes other suitable numbers (e.g., 1, 2, 4, 5, etc.) of transceivers 134 and antennas 138 in other embodiments. In some embodiments, the AP 114-1 includes a higher number of antennas 138 than transceivers 134, and antenna switching techniques are utilized. The PHY processor 130 includes circuitry, coupled to the antennas 138, that is configured to upconvert baseband signals to radio frequency (RF) signals for transmission via the antennas 138. The PHY processor 130 also includes circuitry, coupled to the antennas 138, that is configured to downconvert RF signals received via the antennas 138 to baseband signals.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114-1 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. The PHY processor 130 may be configured to cause the AP 114-1 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 138.

Similarly, the PHY processor 130 may be configured to receive PHY data units that were received via the antennas 138, and extract MAC layer data units encapsulated within the PHY data units. For example, the circuitry configured to downconvert RF signals to baseband signals may output a baseband signal that includes a received PPDU, and the PHY processor 130 may extract one or more MAC layer data units encapsulated in the PPDU. The PHY processor 130 may provide the extracted MAC layer data units to the MAC processor 126, which processes the MAC layer data units.

The WLAN 110-1 includes a plurality of client stations 154. Although two client stations 154 are illustrated in FIG. 1A, the WLAN 110-1 includes other suitable numbers (e.g., 1, 3, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1A, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized. The PHY processor 170 includes circuitry, coupled to the antennas 178, that is configured to upconvert baseband signals to RF signals for transmission via the antennas 178. The PHY processor 170 also includes circuitry, coupled to the antennas 178, that is configured to downconvert RF signals received via the antennas 178 to baseband signals.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using a SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. The PHY processor 170 may be configured to cause the client station 154-1 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 178.

Similarly, the PHY processor 170 may be configured to receive PHY data units that were received via the antennas 178, and extract MAC layer data units encapsulated within the PHY data units. For example, the circuitry configured to downconvert RF signals to baseband signals may output a baseband signal that includes a received PPDU, and the PHY processor 170 may extract one or more MAC layer data units encapsulated in the PPDU. The PHY processor 170 may provide the extracted MAC layer data units to the MAC processor 166, which processes the MAC layer data units.

In an embodiment, the client station 154-2 has a structure that is the same as or similar to the client station 154-1. The client station 154-2 structured the same as or similar to the client station 154-1 has the same or a different number of transceivers and antennas. For example, the client station 154-2 has only two transceivers and two antennas (not shown), according to an embodiment.

The system illustrated in FIG. 1A also includes a WLAN 110-2. The WLAN 110-2 includes an AP 114-2 and a plurality of client stations 180. In an embodiment, the AP 114-2 has a structure that is the same as or similar to the AP 114-1. The AP 114-2 structured the same as or similar to the AP 114-1 has the same or a different number of transceivers and antennas. For example, the AP 114-2 has only two transceivers and two antennas (not shown), according to an embodiment.

In an embodiment, the client stations 180 each have a respective structure that is the same as or similar to the client station 154-1. Each client station 180 structured the same as or similar to the client station 154-1 has the same or a different number of transceivers and antennas. For example, the client station 180-1 has only two transceivers and two antennas (not shown), according to an embodiment.

Although two client stations 180 are illustrated in FIG. 1A, the WLAN 110-2 includes other suitable numbers (e.g., 1, 3, 4, 5, 6, etc.) of client stations 180 in various scenarios and embodiments.

In an embodiment, the APs 114 and the client stations 154, 180 contend for a communication medium using carrier sense multiple access with collision avoidance (CSMA/CA) protocol or another suitable medium access protocol. In an embodiment, the APs 114 and the client stations 154, 180 employ a clear channel assessment (CCA) procedure, in which a communication device (e.g., an AP 114, a client station 154, 180) determines an energy level of the medium in order to determine whether the medium is busy or idle. If the communication device determines that the medium is idle, the communication device generally determines that the communication device can transmit. If the communication device determines that the medium is busy, the communication device waits a backoff period and then checks the medium again after the backoff period. A threshold energy level for determining whether the medium is idle or busy may depend upon the bandwidth of the channel being used by the communication device and/or on whether the energy corresponds to a transmission that conforms to a wireless communication protocol. For example, in the communication protocol defined by the IEEE 802.11 Standard, if the channel bandwidth is 20 Megahertz (MHz), the threshold level is −82 decibel-milliwatts (dBm) for energy from transmissions that conform to the IEEE 802.11 Standard (referred to as "valid 802.11" signals). For channel bandwidths of 40 MHz, 80 MHz, and 160 MHz, the threshold levels are −79 dBm, −76 dBm, and −73 dBm, respectively. For energy of signals not identified by the communication device as a valid 802.11 signal, the threshold level is −62 dBm.

In an embodiment, the APs 114 and the client stations 154, 180 employ a dynamic CCA procedure. In the dynamic CCA procedure, the communication device may use a higher threshold level for valid 802.11 signals from a different BSS as compared to the threshold level for valid 802.11 signals from the same BSS. For example, a communication device might deem a 20 MHz channel to be idle if the energy level of an 802.11 signal from another BSS is less than −62 dBm (i.e., the same threshold level as for energy corresponding to signals that are not valid 802.11 signals), but deem the channel to be busy if the energy level of an 802.11 signal from the same BSS is greater than −82 dBm. Thus, an energy level of −70 dBm of a valid 802.11 signal from a different BSS would result in the device determining that the channel is idle, while an energy level of −70 dBm resulting from same-BSS signals would result in the device determining that the channel is busy. Allowing a higher CCA level for transmissions corresponding to another BSS helps to promote spatial reuse between different BSSs, at least in some embodiments and/or scenarios.

In an embodiment, an identity of a WLAN (sometimes referred to as a Basic Service Set (BSS)), managed by AP of the BSS, is indicated in a Physical Layer Convergence Procedure (PLCP) Protocol Data Unit (PPDU) by a set of bits that describe the "color" of the BSS. The color of a BSS corresponds to an identifier (ID) of the BSS that is shorter than a BSS identifier (BSSID) defined by the IEEE 802.11 Standard. For a PPDU transmitted by a communication device in a BSS, the BSS color of the BSS may be contained in a PHY Signal (SIG) field in a PHY header of the PPDU, whereas the BSSID is typically included in a media access control (MAC) header portion in a payload of the PPDU.

A communication device (e.g., an AP or client station) in a BSS can determine whether a PPDU is from the BSS to which the device belongs (the "same-BSS") or some other BSS (e.g., an overlapping BSS (OBSS)), by decoding the SIG field and interpreting BSS color bits included therein.

One of the newer implementations of the IEEE 802.11 Standard now under development is the IEEE 802.11ax Standard (sometimes referred to as IEEE 802.11 HE or IEEE 802.11 HEW). The IEEE 802.11ax Standard contemplates the dynamic CCA procedure discussed above to help promote spatial reuse between neighboring WLANs.

U.S. patent application Ser. No. 14/961,558, filed on Dec. 7, 2015, entitled "Methods and Apparatus for Carrying Out Backoff Operations," describes example techniques for using a dynamic CCA procedure similar to the procedure discussed above, but with PPDUs that conform to earlier versions of the IEEE 802.11 Standard and thus do not include BSS color information in PHY headers of the PPDUs. For example, MAC address information in a PPDU may be analyzed to determine if the PPDU corresponds to the same BSS or another BSS. U.S. patent application Ser. No. 14/961,558 is hereby incorporated by reference herein in its entirety.

Figure 1B:
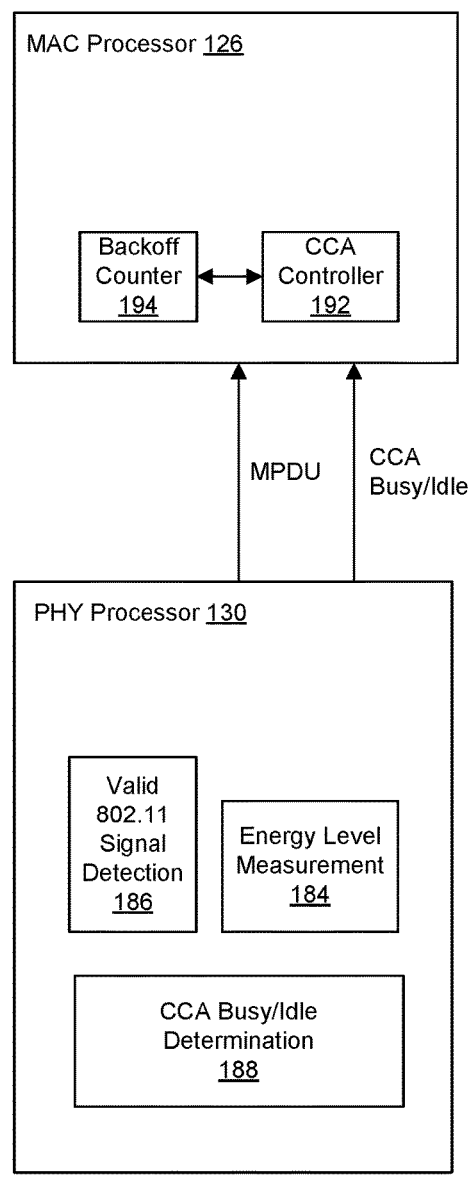
FIG. 1B is a block diagram of an example media access control layer (MAC) processor and an example physical layer (PHY) processor of the system of FIG. 1A, according to an embodiment.

FIG. 1B is a block diagram illustrating CCA-related components of the MAC processor 126 and the PHY processor 130, according to an embodiment.

For example, the PHY processor 130 includes an energy level measurement circuit 184 configured to measure an energy level of the channel medium. The PHY processor 130 also includes a logic device 186 configured to detect whether a received signal is a signal that conforms to a wireless communication protocol (e.g., is a valid 802.11 signal). In an embodiment, the logic device 186 is configured to detect whether a received signal includes a PHY preamble and/or PHY header that conforms to the wireless communication protocol (e.g., a protocol that conforms to the IEEE 802.11 Standard, a protocol that conforms to a version of the IEEE 802.11 Standard not yet approved, or another suitable wireless communication protocol). In an embodiment, determining whether a PHY header in a received signal conforms to the wireless communication protocol includes one or both of i) determining whether at least a portion of the PHY header has a format that conforms to the wireless communication protocol, and ii) determining whether at least a portion of the PHY header includes data that is valid according to the wireless communication protocol.

The PHY processor 130 also includes a logic device 188 configured to perform the dynamic CCA procedure discussed above. For example, in an embodiment, the logic device 188 is configured to compare the energy level of the channel medium, as measured by the circuit 184, to an energy level threshold to determine whether the channel medium is idle or busy. If the measured energy level is above the threshold, the logic device 188 determines that the channel medium is busy, and if the measured energy level is below the threshold, the logic device 188 determines that the channel medium is idle. The energy level threshold used by the logic device 188 varies depending on, for example, whether there is a valid 802.11 signal detected by the logic device 186, a bandwidth of the channel medium, whether the signal is a same-BSS signal, whether the signal is from a co-located BSS, etc. For signals that are not valid 802.11 signals, the logic device 188 uses a suitable energy level threshold such as −62 dBm or another suitable threshold. For signals that are valid 802.11 signals from a different BSS, the logic device 188 uses a suitable energy level threshold such as −62 dBm. For signals that are valid 802.11 signals from the same BSS, the logic device 188 uses a suitable energy level threshold that is greater than the thresholds used for not valid 802.11 signals and valid signals from a different BSS (e.g., a suitable threshold greater than −62 dBm). In an embodiment, the MAC processor 126 is configured to determine whether a valid 802.11 signal is from a co-located BSS or OBSS.

The PHY processor 130 is configured to generate an indication of whether the channel medium is busy or idle (e.g., a CCA busy/idle signal), and provide the indication to the MAC processor 126.

The MAC processor 126 includes a logic device 192 configured to control a backoff counter 194. The backoff counter 194 is used by the MAC processor 126 to determine when the network device 122 is permitted to transmit in the channel medium. For example, if the backoff counter 194 is not zero, the network device 122 is not permitted to transmit, whereas when the backoff counter 194 reaches zero, the network device 122 is permitted to transmit. The logic device 192 is configured to receive the CCA busy/idle signal, stop the backoff counter 194 when the CCA busy/idle signal indicates the channel medium is busy, and permit the backoff counter 194 to decrement when the CCA busy/idle signal indicates the channel medium is idle.

In an embodiment, the logic device 186 is implemented using hardware circuitry, such as a hardware state machine. In another embodiment, the logic device 186 is implemented using a processor executing machine readable instructions. In an embodiment, the logic device 188 is implemented using hardware circuitry, such as a hardware state machine. In another embodiment, the logic device 188 is implemented using a processor executing machine readable instructions. In an embodiment, the logic device 192 is implemented using hardware circuitry, such as a hardware state machine. In another embodiment, the logic device 192 is implemented using a processor executing machine readable instructions. In an embodiment, the backoff counter 194 is implemented using hardware counter circuitry.

Figure 2A:
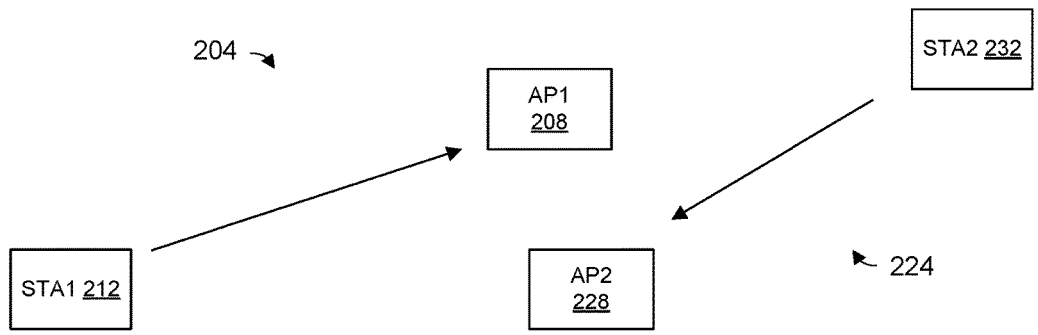
FIG. 2A is a diagram of an example of multiple WLANs with two co-located access points (APs), according to an embodiment.

FIG. 2A is a diagram of an example scenario of two WLANs with co-located (e.g., relatively closely located) APs, according to an embodiment. A first WLAN 204 includes an AP 208 (AP1) and a client station 212 (STA1), and a second WLAN 224 includes an AP 228 (AP2) and a client station 232 (STA2). AP1 and AP2 are co-located, whereas STA1 and STA2 are not co-located. In other words, a distance between AP1 and AP2 is relatively small as compared to a distance between STA1 and STA2.

The first WLAN 204 corresponds to a first BSS color, thus a PPDU transmitted by a device in the first WLAN 204 includes the first BSS color (Color 1) in a PHY header of the PPDU. The second WLAN 224 corresponds to a second BSS color, thus a PPDU transmitted by a device in the second WLAN 224 includes the second BSS color (Color 2) in a PHY header of the PPDU.

Figure 2B:
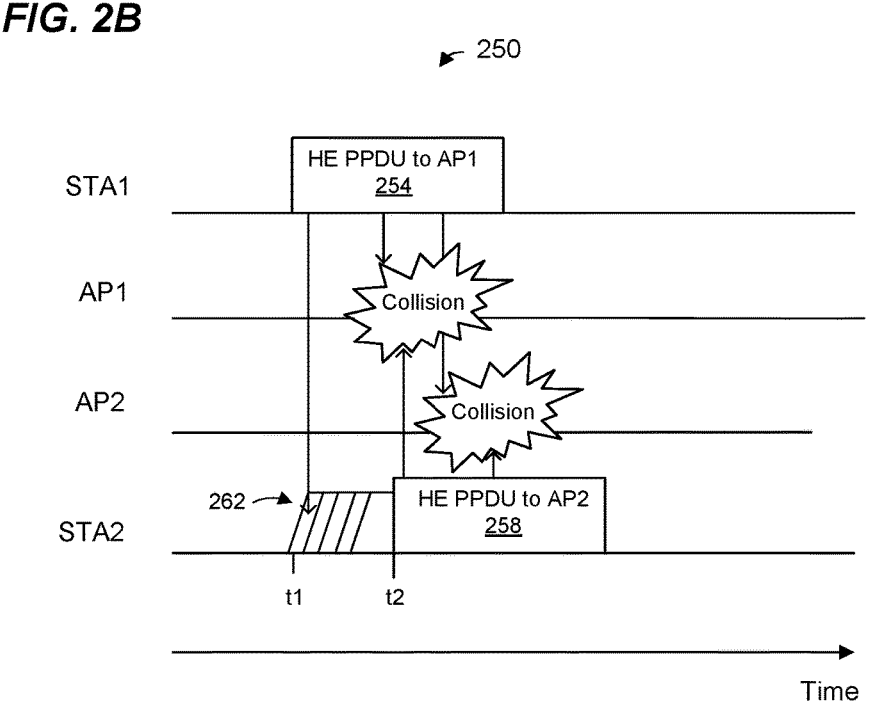
FIG. 2B is a message sequence diagram illustrating an example scenario of transmissions by the stations illustrated in FIG. 2A, according to an embodiment.

FIG. 2B is a message sequence diagram of an example scenario of multiple transmissions among STA1, STA2, AP1 and AP2 (e.g., STA 212, STA 232, AP 208, and AP 228 of FIG. 2A). At time t1, STA1 begins transmitting a HE PPDU 254 to AP1. STA2 wishes to transmit a HE PPDU 258 to AP2, and therefore STA2 performs a CCA procedure 262 (illustrated in FIG. 2B by diagonal lines) to determine whether the channel is idle. In carrying out the CCA procedure 262, STA2 detects and decodes at least a portion of a PHY header of HE PPDU 254, and identifies the BSS color associated with HE PPDU 254 as Color 1. Because the Color 1 of HE PPDU 254 is different than the color of the WLAN 224 (to which STA2 belongs), STA2 uses the dynamic CCA level (i.e., allows for a higher energy level threshold than a standard CCA level associated with valid 802.11 signals in a same BSS). Using the dynamic CCA level, STA2 concludes that the channel is clear and, at time t2, begins transmitting a HE PPDU 258 to AP2. However, because a distance between AP2 and STA1 is shorter than a distance between STA1 and STA2, an energy level of HE PPDU 254 as experienced at AP2 is higher than the energy level of HE PPDU 254 as experienced at STA1. In some scenarios, the energy level of HE PPDU 254 as experienced at AP2 will be high enough to adversely affect reception by AP2 of HE PPDU 258 such that AP2 cannot properly decode HE PPDU 258, i.e., a collision. Similarly, in some scenarios, the energy level of HE PPDU 258 as experienced at AP1 will be high enough to adversely affect reception by AP1 of HE PPDU 254 such that AP1 cannot properly decode HE PPDU 254, i.e., a collision.

Accordingly, in an attempt to reduce collisions in scenarios in which two APs are proximate to each other, various embodiments described below relate to causing communication devices in a first network, served by a first AP (AP1), to not use the dynamic CCA procedure in connection with transmissions from a second network, served by a second AP (AP2).

Figure 3:
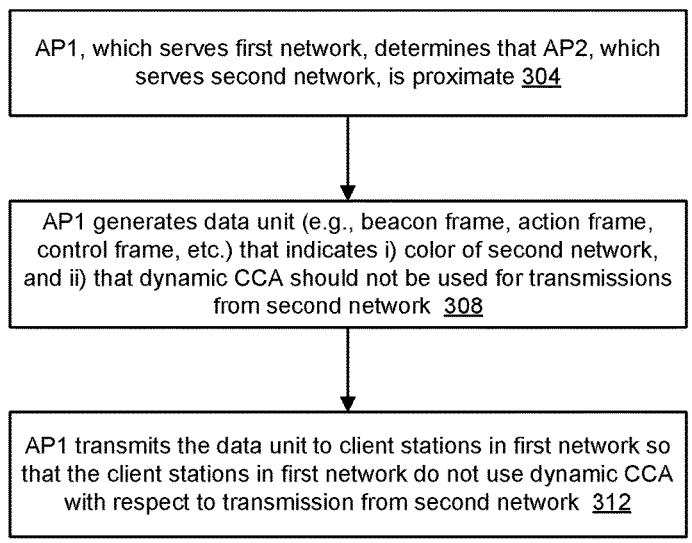
FIG. 3 is a flow diagram of an example method for causing communication devices in a first network, served by a first access point (AP), to not use a dynamic clear channel assessment (CCA) procedure in connection with transmissions from a second network, served by a second AP in order to reduce collisions with transmissions from the second network, according to an embodiment.

FIG. 3 is a flow diagram of an example method 300 for causing communication devices in a first network, served by a first AP (AP1), to not use the dynamic CCA procedure in connection with transmissions from a second network, served by a second AP (AP2), in order to reduce collisions with transmissions from the second network, according to an embodiment. In some embodiments, the network interface device 122 and optionally the host processor 117 of FIG. 1A are configured to implement the method 300. The method 300 is described in the context of the network interface device 122 and the host processor 118 merely for explanatory purposes, however, and in other embodiments, the method 300 is implemented by another suitable device.

At block 304, the network interface device 122 (and/or the host processor 118) of the first AP (AP1), which serves (e.g., is associated with) the first communication network, determines that the second AP (AP2), which serves the second communication network, is located proximate to the first AP. In an embodiment, the first AP determines that the second AP is located proximate to (e.g., in close proximity to) the first AP based on a determined distance between the first AP and the second AP. For example, the determined distance may be compared to a threshold, and the AP may determine that the second AP is located proximate to the first AP based on the comparison to the threshold. The first AP may determine (e.g., estimate) the distance based on measuring a signal strength of transmissions from the second AP, for example. If the first AP has knowledge of a position of the first AP (e.g., via a positioning system (e.g., an FTM protocol, a global positioning system, a regional positioning system, etc.) and a position of the second AP (e.g., by receiving the position of the second AP from the second AP, another communication device, etc.), the first AP may determine the distance based on the position of the first AP and the position of the second AP, for example.

In an embodiment, if the first AP compares the distance between the first AP and the second AP to a threshold, the threshold may vary. For example, the threshold may vary based on determined distances between other communication devices, such as a distance between the first AP and a client station in the first network, and/or a distance between the first AP and a client station in the second network. For example, with reference to FIG. 2A, AP1 may determine that the threshold based on a distance between AP1 and STA1 and/or a distance between AP1 and STA2, according to an embodiment.

At block 308, the network interface device 122 of the first AP generates a data unit (e.g., a beacon frame, an action frame, a control frame, etc.) that includes information indicating i) a color identifier of the second communication network and ii) that the dynamic CCA procedure (such as described above, or another suitable dynamic CCA procedure) should not be used by client stations in the first communication network for transmissions from the second communication network. The color identifier of the second communication network is usable (e.g., by communication devices in the first or second communication networks) to identify or determine that a given transmission is from the second communication network (is from a device associated with the second communication network).

At block 312, the first AP transmits the generated data unit to client stations in the first network (e.g., client stations 154-1, 154-2) to instruct the client stations in the first network to not use the dynamic CCA procedure with respect to transmissions identified as being from the second communication network. For example, in an embodiment, client stations in the first network identify a transmission as being from the second communication network by determining that a color identifier included in the transmission corresponds to the color identifier of the second communication network indicated in the information included in the data unit generated and transmitted by the first AP. In some embodiments, the transmission from the second communication network includes a communication frame (e.g., a data frame, control frame, management frame, etc.), where the color identifier is included in a physical layer (PHY) header of the communication frame.

In some embodiments where the client stations in the first network have been instructed to not use the dynamic CCA procedure with respect to transmissions from the second network, the client stations in the first network will instead use a different (e.g., non-dynamic or static) CCA procedure. For example, the client stations in the first network will employ a CCA procedure that does not utilize a higher threshold (e.g., energy threshold) for transmissions from the second network as compared to the transmission from the first network when assessing whether the communication channel is busy or idle, according to an embodiment. In another example, instead of depending upon whether a given transmission is from a same-BSS or a different BSS, a threshold energy level for determining whether the medium is idle or busy may depend upon the bandwidth of the channel being used by the communication device and/or on whether the energy corresponds to a transmission that conforms to a wireless communication protocol, in an embodiment.

Figure 4:
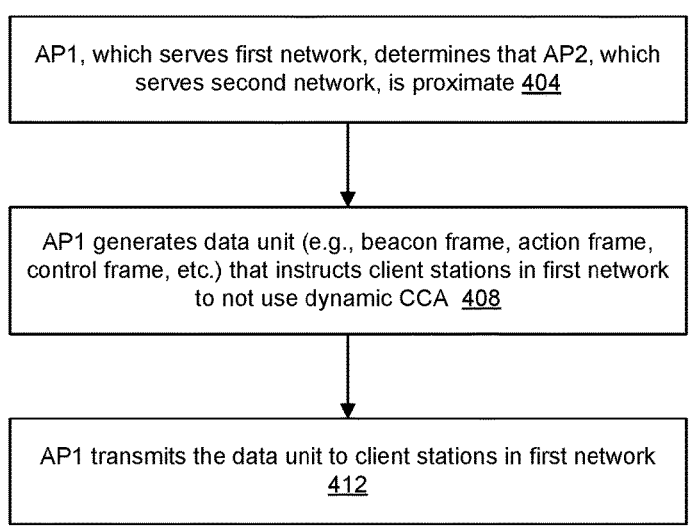
FIG. 4 is a flow diagram of an example method for causing communication devices in a first network to not use a dynamic CCA procedure in order to reduce collisions with transmissions from a second network, according to an embodiment.

FIG. 4 is a flow diagram of an example method 400 for causing communication devices in a first network to not use the dynamic CCA procedure (described above) in order to reduce collisions with transmissions from a second network, according to an embodiment. In some embodiments, the network interface device 122 of FIG. 1A is configured to implement the method 400. The method 400 is described in the context of the network interface device 122 merely for explanatory purposes, however, and in other embodiments, the method 400 is implemented by another suitable device.

At block 404, the network interface device 122 of the first AP (AP1), which serves (e.g., is associated with) the first communication network, determines that the second AP (AP2), which serves the second communication network, is located proximate to the first AP.

At block 408, the first AP (e.g., the network interface device 122 of the first AP) generates a data unit (e.g., a beacon frame, an action frame, a control frame, etc.) that includes information indicating that the dynamic CCA procedure (such as described above, or another suitable dynamic CCA procedure) should not be used by client stations in the first communication network. At block 412, the first AP transmits the generated data unit to client stations in the first network (e.g., client stations 154-1, 154-2) so that the client stations in the first network do not use the dynamic CCA procedure. For example, in some embodiments where the client stations in the first network have been instructed to not use the dynamic CCA procedure at all, the client stations in the first network will instead use a different (e.g., non-dynamic or static) CCA procedure. For example, the client stations in the first network will employ a CCA procedure that does not utilize different thresholds (e.g., energy thresholds) when assessing whether the communication channel is busy or idle, according to an embodiment. In an embodiment, a threshold energy level for determining whether the medium is idle or busy may depend upon the bandwidth of the channel being used by the communication device and/or on whether the energy corresponds to a transmission that conforms to a wireless communication protocol.

Figure 5:
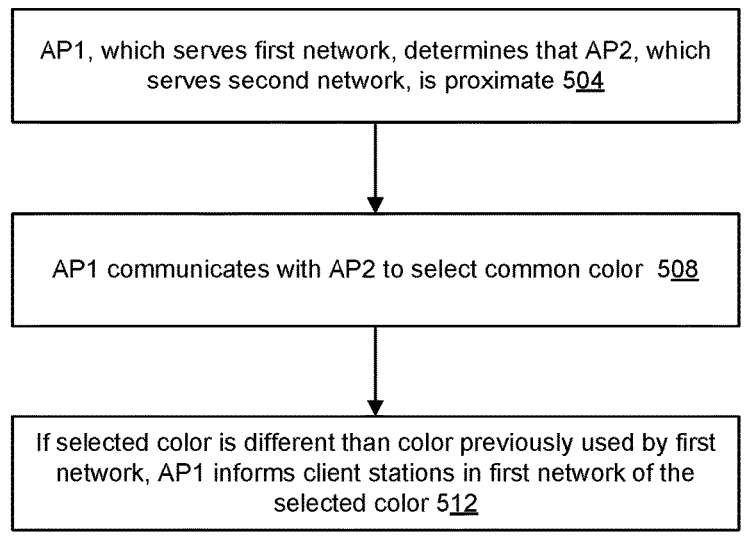
FIG. 5 is a flow diagram of an example method for selecting a common identifier (color) for a first network served by a first AP and a second network served by a second AP in order to reduce collisions between transmissions of the first network and transmission of the second network, according to an embodiment.

FIG. 5 is a flow diagram of an example method 500 for selecting a common identifier (e.g., color) for a first network served by a first AP (AP1) and a second network served by a second AP (AP2) in order to reduce collisions between transmissions of the first network and transmissions of the second network, according to an embodiment. In some embodiments, the network interface device 122 of FIG. 1 is configured to implement the method 500. The method 500 is described in the context of the network interface device 122 merely for explanatory purposes, however, and in other embodiments, the method 500 is implemented by another suitable device.

At block 504, the network interface device 122 of the first AP (AP1), which serves (e.g., is associated with) the first communication network, determines that the second AP (AP2), which serves the second communication network, is located proximate to the first AP.

At block 508, the first AP communicates with the second AP to select a common identifier for the first and second communication networks. For example, in an embodiment, the first AP selects a color identifier for the first network that corresponds to a color identifier for the second network. The first AP and the second AP may communicate in any suitable manner to select a common color identifier for the first and second networks, according to some embodiments.

At block 510, if the color identifier selected by the first AP (the color identifier that is common to both the first and second networks) is different than a color identifier previously used by the first network, the first AP will inform (e.g., notify) the client stations in the first network of the selected color identifier. For example, in an embodiment, the first AP (e.g., the network interface device 122 of the first AP) generates a data unit (e.g., a beacon frame, a control frame, etc.) that includes information indicating the selected color identifier of the first communication network, and transmits this data unit to the client stations in the first network so that the client stations use the selected color identifier to identify transmissions from the first communication network, according to an embodiment. In some embodiments, the first AP informs the client stations in the first network of the selected color identifier using another suitable technique.

With a mobile AP serving a mobile network, the mobile AP will, over time, come into proximity with other APs of multiple other fixed networks. Because of the number of other APs to which the mobile AP will likely become proximate over time, there may be a significant probability that the color of the mobile network will be the same as one or more of the multiple other fixed networks. Thus, to mitigate potential problems caused by mobile networks using the same color as proximate fixed networks, a set of colors that may be used by APs is portioned into a plurality of sets including a first set preferred for use by APs of mobile networks, and a second set preferred for use by APs of fixed networks, in an embodiment. APs of mobile networks will first attempt to select a color from the first set of colors preferred for use by APs of mobile networks, and APs of fixed networks will first attempt to select a color from the second set of colors preferred for use by APs of fixed networks, according to an embodiment. In such embodiments, the probability that a given mobile network will have the same color as a given fixed network is therefore reduced.

Figure 6:
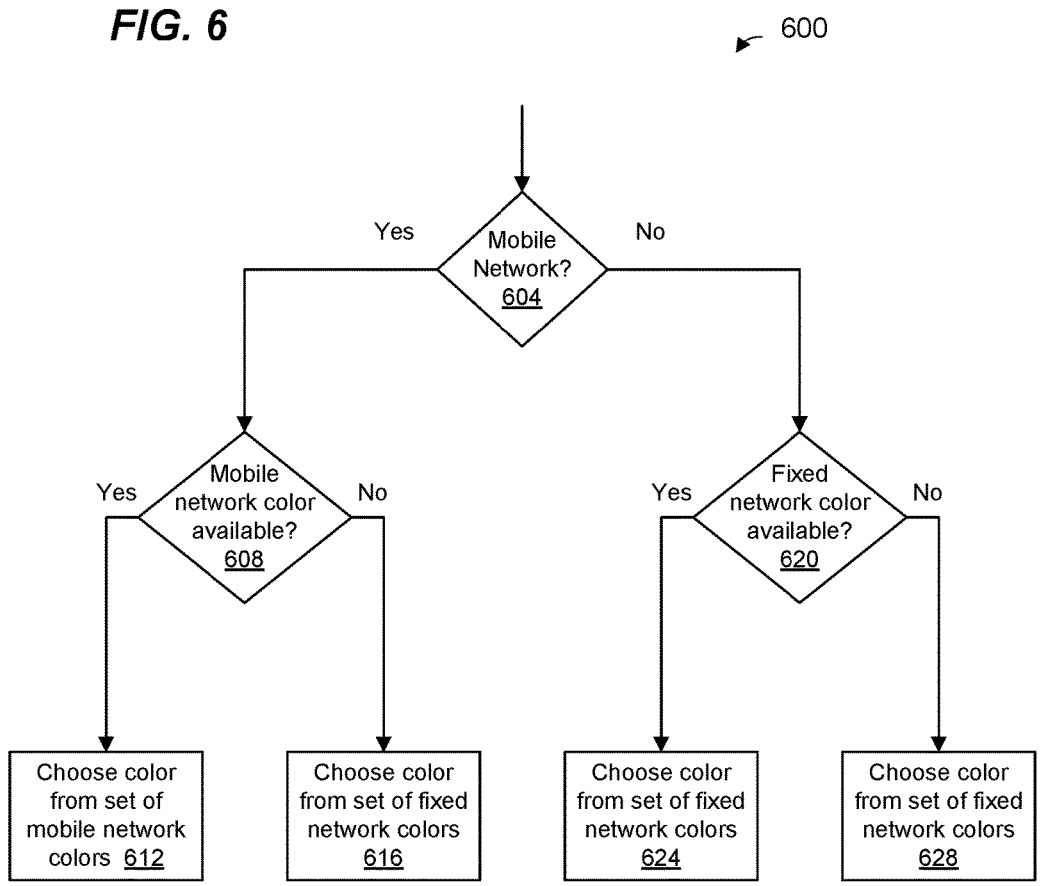
FIG. 6 is a flow diagram of an example method for an AP to select a color for a network served by the AP, according to an embodiment.

FIG. 6 is a flow diagram of an example method 600 for an AP to select a color for a network served by the AP, according to an embodiment. In some embodiments, the network interface device 122 and optionally the host processor 118 of FIG. 1 is configured to implement the method 600. The method 600 is described in the context of the network interface device 122 and the host processor 118 merely for explanatory purposes, however, and in other embodiments, the method 600 is implemented by another suitable device.

At block 604, the AP determines if the AP is serving a mobile network. For example, the AP may have configuration information stored in a memory of the AP (e.g., a memory of or coupled to the host processor 118, a memory of or coupled to the network interface 122), where the configuration information indicates whether the AP is serving a mobile network. Thus, block 604 may include retrieving configuration information stored in a memory of the AP and analyzing the retrieved configuration information to determine if the AP is serving a mobile network. For example, a hand-held device, such as a mobile phone, a laptop computer, a tablet computer, etc., or a communication device built for incorporation into a vehicle (e.g., a network interface device built for incorporation in an automobile) may store configuration information in a memory indicating that, when the device acts as an AP, the AP should be considered as serving a mobile network. As another example, an infrastructure AP device such as an AP designed to remain in a fixed position for long periods of time (e.g., with multiple external antennas, an alternating current (AC) power supply, etc.) may store configuration information in a memory indicating that the AP should be considered as serving a fixed network.

In some embodiments in which the AP includes, or is coupled to, a mobile positioning system, the AP may be configured to determine whether the AP is serving a mobile network based on information from the mobile positioning system, such as position information, velocity information, etc. For example, the AP may determine whether the AP is moving based on analyzing positioning information over time. As another example, the AP may determine whether the AP is moving based on analyzing velocity information. Block 604 may include comparing velocity information to a threshold to determine whether AP is serving a mobile network.

If it is determined at block 604 that the AP is serving a mobile network, the flow proceeds to block 608. At block 608, the AP determines if any network IDs (e.g., colors), from a first set of network IDs preferred for use in mobile networks, are available. For example, if the AP determines that neighboring networks are already using all of the network IDs in the first set of network IDs, the AP determines that no network IDs in the first set of network IDs are available; whereas if the AP determines that there are one or more network IDs in the first set of network IDs that are not being used by neighboring networks, the AP determines that there is at least one network ID in the first set of network IDs that is available.

If it is determined at block 608 that there is at least one network ID in the first set of network IDs that is available, the flow proceeds to block 612. At block 612, the AP chooses a network ID from the first set of network IDs that is preferred for use in mobile networks.

On the other hand, if it is determined at block 608 that there are no network IDs in the first set of network IDs that are available, the flow proceeds to block 616. At block 612, the AP chooses a network ID from a second set of network IDs that is preferred for use in fixed (i.e., non-mobile) networks.

On the other hand, if it is determined at block 604 that the AP is serving a fixed network, the flow proceeds to block 620. At block 620, the AP determines if any network IDs (e.g., colors), from the second set of network IDs preferred for use in fixed networks, are available. For example, if the AP determines that neighboring networks are already using all of the network IDs in the second set of network IDs, the AP determines that no network IDs in the second set of network IDs are available; whereas if the AP determines that there are one or more network IDs in the second set of network IDs that are not being used by neighboring networks, the AP determines that there is at least one network ID in the second set of network IDs that is available.

If it is determined at block 620 that there is at least one network ID in the second set of network IDs that is available, the flow proceeds to block 624. At block 624, the AP chooses a network ID from the second set of network IDs that is preferred for use in fixed networks.

On the other hand, if it is determined at block 620 that there are no network IDs in the second set of network IDs that are available, the flow proceeds to block 628. At block 628, the AP chooses a network ID from the first set of network IDs that is preferred for use in mobile networks.

After the AP has chosen a network ID at any of blocks 612, 616, 624, or 628, the AP may inform client stations in the network of the chosen network ID, such as described above.

In some embodiments where the AP is either preconfigured as serving a mobile network, or preconfigured as serving a fixed network, some of the blocks of FIG. 6 may be omitted. For example, if the AP is preconfigured as serving a mobile network, the AP may be configured to only perform blocks 608, 612, and 616. As another example, if the AP is preconfigured as serving a fixed network, the AP may be configured to only perform blocks 620, 624, and 628.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method comprising:
   determining, at a first communication device associated with a first communication network, that a second communication device associated with a second communication network is located proximate to the first communication device;
   generating, at the first communication device, a data unit that includes information indicating i) a color identifier of the second communication network, the color identifier usable to identify transmissions from the second communication network, and ii) that a dynamic clear channel assessment (CCA) procedure should not be used for transmissions from the second communication network, wherein the dynamic CCA procedure includes utilizing a higher energy level threshold for processing transmissions from communication networks different than the first communication network than for processing transmissions from the first communication network; and
   causing the first communication device to transmit the data unit to at least one other communication device associated with the first communication network such that the at least one other communication device associated with the first communication network considers all transmissions that include, in physical layer (PHY) headers, the color identifier of the second communication network as being from the first communication network for CCA purposes.

2. The method of claim 1, wherein the data unit generated at the first communication device includes a beacon frame, the beacon frame including the information indicating i) the color identifier of the second communication network and ii) that the dynamic CCA procedure should not be used for transmissions from the second communication network.

3. The method of claim 1, wherein the data unit generated at the first communication device includes one of an action frame and a control frame, the one of the action frame and the control frame including the information indicating i) the color identifier of the second communication network and ii) that the dynamic CCA procedure should not be used for transmissions from the second communication network.

4. The method of claim 1, wherein:
   causing the first communication device to transmit the data unit to at least one other communication device associated with the first communication network includes providing, at the first communication device, a baseband signal that includes the data unit to circuitry configured to upconvert the baseband signal to a radio frequency for transmission.

5. An apparatus, comprising:
   a network interface device associated with a first communication device, the first communication device being associated with a first communication network, wherein the network interface device includes one or more integrated circuits (ICs) configured to:
      determine that a second communication device associated with a second communication network is located proximate to the first communication device,
      generate a data unit that includes information indicating i) a color identifier of the second communication network, the color identifier usable to identify transmissions from the second communication network, and ii) that a dynamic clear channel assessment (CCA) procedure should not be used for transmissions from the second communication network, wherein the dynamic CCA procedure includes utilizing a higher energy level threshold for processing transmissions from communication networks different than the first communication network than for processing transmissions from the first communication network, and
      cause the first communication device to transmit the data unit to at least one other communication device associated with the first communication network such that the at least one other communication device associated with the first communication network considers all transmissions that include, in physical layer (PHY) headers, the color identifier of the second communication network as being from the first communication network for CCA purposes.

6. The apparatus of claim 5, wherein the one or more ICs of the network interface device are configured to generate the data unit to include a beacon frame, the beacon frame including the information indicating i) the color identifier of the second communication network and ii) that the dynamic CCA procedure should not be used for transmissions from the second communication network.

7. The apparatus of claim 5, wherein the one or more ICs of the network interface device are configured to generate the data unit to include one of an action frame and a control frame, the one of the action frame and the control frame including the information indicating i) the color identifier of the second communication network and ii) that the dynamic CCA procedure should not be used for transmissions from the second communication network.

8. The apparatus of claim 5, wherein:
   the network interface device includes a physical layer (PHY) processor implemented using the one or more ICs, the PHY processor including circuitry configured to upconvert baseband signals to radio frequency signals for transmission; and
   the PHY processor is configured to:
      cause the first communication device to transmit the data unit to the at least one other communication device associated with the first communication network at least by providing a baseband signal that includes the data unit to the circuitry configured to upconvert baseband signals to radio frequency signals.

9. A method comprising:

receiving, at a first communication device associated with a first communication network, a data unit including information indicating i) a color identifier of a second communication network proximate to the first communication network, the color identifier of the second communication network usable to identify transmissions from the second communication network, and ii) that a dynamic clear channel assessment (CCA) procedure should not be used by the first communication device for transmissions from the second communication network, wherein the dynamic CCA procedure includes utilizing a higher energy level threshold for processing transmissions from communication networks different than the first communication network than for processing transmissions from the first communication network; and responsive to identifying a transmission that includes, in a physical layer (PHY) header, the color identifier of the second communication network, the first communication device considering the transmission that includes the color identifier of the second communication network as being from the first communication network for CCA purposes.

10. The method of claim 9, wherein the data unit received at the first communication device includes a beacon frame, the beacon frame including the information indicating i) the color identifier of the second communication network and ii) that the dynamic CCA procedure should not be used by the first communication device for transmissions from the second communication network.

11. The method of claim 9, wherein the data unit received at the first communication device includes one of an action frame and a control frame, the one of the action frame and control frame including the information indicating i) the color identifier of the second communication network and ii) that the dynamic CCA procedure should not be used by the first communication device for transmissions from the second communication network.

12. The method of claim 9, wherein identifying a transmission from the second communication network includes:

determining that a color identifier included in a transmission received at the first communication device corresponds to the color identifier of the second communication network indicated in the information included in the received data unit.

13. The method of claim 12, wherein the transmission received at the first communication device includes a communication frame, and wherein the color identifier is included in a PHY header of the received communication frame.

14. The method of claim 9, wherein the dynamic CCA procedure includes:

utilizing a first energy level threshold for processing transmissions from the second communication network that is higher than a second energy level threshold for processing transmissions from the first communication network.

15. An apparatus, comprising:

a network interface device associated with a first communication device, the first communication device being associated with a first communication network, wherein the network interface device includes one or more integrated circuits (ICs) configured to:

receive a data unit including information indicating i) a color identifier of a second communication network proximate to the first communication network, the color identifier of the second communication network usable to identify transmissions from the second communication network, and ii) that a dynamic clear channel assessment (CCA) procedure should not be used by the first communication device for transmissions from the second communication network, wherein the dynamic CCA procedure includes utilizing a higher energy level threshold for processing transmissions from communication networks different than the first communication network than for processing transmissions from the first communication network; and responsive to identifying a transmission that includes, in a physical layer (PHY) header, the color identifier of the second communication network, considering the transmission that includes the color identifier of the second communication network as being from the first communication network for CCA purposes.

16. The apparatus of claim 15, wherein the one or more ICs of the network interface device are configured to receive a beacon frame included in the data unit, the beacon frame including the information indicating i) the color identifier of the second communication network and ii) that the dynamic CCA procedure should not be used by the first communication device for transmissions from the second communication network.

17. The apparatus of claim 15, wherein the one or more ICs of the network interface device are configured to receive one of an action frame and a control frame included in the data unit, the one of the action frame and control frame including the information indicating i) the color identifier of the second communication network and ii) that the dynamic CCA procedure should not be used by the first communication device for transmissions from the second communication network.

18. The apparatus of claim 15, wherein the one or more ICs of the network interface device are configured to:

determine that a color identifier included in a transmission received at the first communication device corresponds to the color identifier of the second communication network indicated in the information included in the received data unit.

19. The apparatus of claim 18, wherein the transmission received at the first communication device includes a communication frame, the one or more ICs of the network interface device are configured to:

decode at least a portion of a PHY header of the received communication frame; and determine the color identifier included in the received transmission based on the decoded portion of the PHY header.

20. The apparatus of claim 15, wherein the dynamic CCA procedure includes:

utilizing a first energy level threshold for processing transmissions from the second communication network that is higher than a second energy level threshold for processing transmissions from the first communication network.

21. A method comprising:

determining, at a first communication device associated with a first communication network, that a second communication device associated with a second communication network is located proximate to the first communication device;

generating, at the first communication device, a data unit that includes information indicating that a dynamic clear channel assessment (CCA) procedure should not be used by at least one other communication device associated with the first communication network, wherein the dynamic CCA procedure includes utilizing a higher energy level threshold for processing transmissions from communication networks different than the first communication network than for processing transmissions from the first communication network; and causing the first communication device to transmit the data unit to the at least one other communication device associated with the first communication network such that the at least one other communication device associated with the first communication network considers all transmissions received at the at least one other communication device associated with the first communication network as being from the first communication network for CCA purposes.

22. The method of claim 21, wherein the data unit generated at the first communication device includes a beacon frame, the beacon frame including the information indicating that the dynamic CCA procedure should not be used by the at least one other communication device associated with the first communication network.

23. The method of claim 21, wherein the data unit generated at the first communication device includes one of an action frame and a control frame, the one of the action frame and control frame including the information indicating that the dynamic CCA procedure should not be used by the at least one other communication device associated with the first communication network.

24. The method of claim 21, wherein:
causing the first communication device to transmit the data unit to at least one other communication device associated with the first communication network includes providing, at the first communication device, a baseband signal that includes the data unit to circuitry configured to upconvert the baseband signal to a radio frequency for transmission.

25. The method of claim 21, wherein the dynamic CCA procedure includes:
utilizing a first energy level threshold for processing transmissions from the second communication network that is higher than a second energy level threshold for processing transmissions from the first communication network.

26. An apparatus, comprising:
a network interface device associated with a first communication device, the first communication device being associated with a first communication network, wherein the network interface device includes one or more integrated circuits (ICs) configured to:
determine that a second communication device associated with a second communication network is located proximate to the first communication device,
generate a data unit that includes information indicating that a dynamic clear channel assessment (CCA) procedure should not be used by at least one other communication device associated with the first communication network, wherein the dynamic CCA procedure includes utilizing a higher energy level threshold for processing transmissions from communication networks different than the first communication network than for processing transmissions from the first communication network, and cause the first communication device to transmit the data unit to the at least one other communication device associated with the first communication network such that the at least one other communication device associated with the first communication network considers all transmissions received at the at least one other communication device associated with the first communication network as being from the first communication network for CCA purposes.

27. The apparatus of claim 26, wherein the one or more ICs of the network interface device are configured to generate the data unit to include a beacon frame, the beacon frame including the information indicating that the dynamic CCA procedure should not be used by the at least one other communication device associated with the first communication network.

28. The apparatus of claim 26, wherein the one or more ICs of the network interface device are configured to generate the data unit to include one of an action frame and a control frame, the one of the action frame and control frame including the information indicating that the dynamic CCA procedure should not be used by the at least one other communication device associated with the first communication network.

29. The apparatus of claim 26, wherein:
the network interface device includes a physical layer (PHY) processor implemented using the one or more ICs, the PHY processor including circuitry configured to upconvert baseband signals to radio frequency signals for transmission; and
the PHY processor is configured to:
cause the first communication device to transmit the data unit to the at least one other communication device associated with the first communication network at least by providing a baseband signal that includes the data unit to the circuitry configured to upconvert baseband signals to radio frequency signals.

30. The apparatus of claim 26, wherein the dynamic CCA procedure includes:
utilizing a first energy level threshold for processing transmissions from the second communication network that is higher than a second energy level threshold for processing transmissions from the first communication network.

* * * * *